(12) United States Patent
Barritault

(10) Patent No.: US 11,981,367 B2
(45) Date of Patent: May 14, 2024

(54) STEERING WHEEL

(71) Applicant: Autoliv Development AB, Vargarda (SE)

(72) Inventor: Matthis Barritault, Poitiers (FR)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 17/755,655

(22) PCT Filed: Oct. 29, 2020

(86) PCT No.: PCT/EP2020/080342
§ 371 (c)(1),
(2) Date: May 4, 2022

(87) PCT Pub. No.: WO2021/089390
PCT Pub. Date: May 14, 2021

(65) Prior Publication Data
US 2022/0355847 A1 Nov. 10, 2022

(30) Foreign Application Priority Data
Nov. 5, 2019 (FR) ...................................... 1912412

(51) Int. Cl.
*B62D 1/06* (2006.01)
(52) U.S. Cl.
CPC ...................................... *B62D 1/06* (2013.01)
(58) Field of Classification Search
CPC . B62D 1/04; B62D 1/06; B62D 1/065; B62D 1/046
See application file for complete search history.

(56) References Cited

U.S. PATENT DOCUMENTS

| 6,443,030 | B1 | 9/2002 | Schuler | |
|---|---|---|---|---|
| 6,499,377 | B1* | 12/2002 | Schuler | B62D 1/06 |
| | | | | 74/558 |
| 9,352,768 | B2 | 5/2016 | Doursoux et al. | |
| 11,130,443 | B1* | 9/2021 | Matsu | G02B 6/102 |
| 2002/0017157 | A1* | 2/2002 | Kreuzer | B62D 1/06 |
| | | | | 74/552 |

(Continued)

FOREIGN PATENT DOCUMENTS

| DE | 1194273 B | 6/1965 |
|---|---|---|
| DE | 29910992 U1 | 11/1999 |

(Continued)

OTHER PUBLICATIONS

Machine Translation of DE 10 2017 220 161.*

*Primary Examiner* — Thomas C Diaz
(74) *Attorney, Agent, or Firm* — Matthew D. Thayne; Thayne and Davis LLC

(57) ABSTRACT

A steering wheel configured to rotate about a steering axis, comprising a rim formed of a body molded onto a frame, the body having a first mold release axis, a first groove arranged in the body in a demoldable manner relative to the first mold release axis, a sheathing reinforcement arranged to be inserted into the first groove of the body and at least partially form a second groove, wherein the second groove is arranged to receive an insert in an insertion direction separate from the first mold release axis, and in that the sheathing reinforcement comprises at least one portion which is undercut relative to the first mold release axis.

17 Claims, 4 Drawing Sheets

(56) References Cited

U.S. PATENT DOCUMENTS

| | | | |
|---|---|---|---|
| 2007/0137413 A1* | 6/2007 | Xu | B60R 13/02 |
| | | | 74/552 |
| 2014/0013898 A1 | 1/2014 | Doursoux et al. | |
| 2019/0016383 A1* | 1/2019 | Spencer | B60Q 3/283 |
| 2020/0180674 A1* | 6/2020 | Spencer | B62D 1/08 |
| 2022/0306198 A1* | 9/2022 | Sakakibara | B60Q 3/283 |

FOREIGN PATENT DOCUMENTS

| | | | | |
|---|---|---|---|---|
| DE | 10328988 A1 | 1/2005 | | |
| DE | 102017220161 A1 * | 5/2019 | | B60R 13/02 |
| EP | 2511153 A1 | 10/2012 | | |
| GB | 980673 A | 1/1965 | | |
| JP | H0455164 A | 2/1992 | | |

\* cited by examiner

[Fig. 1]
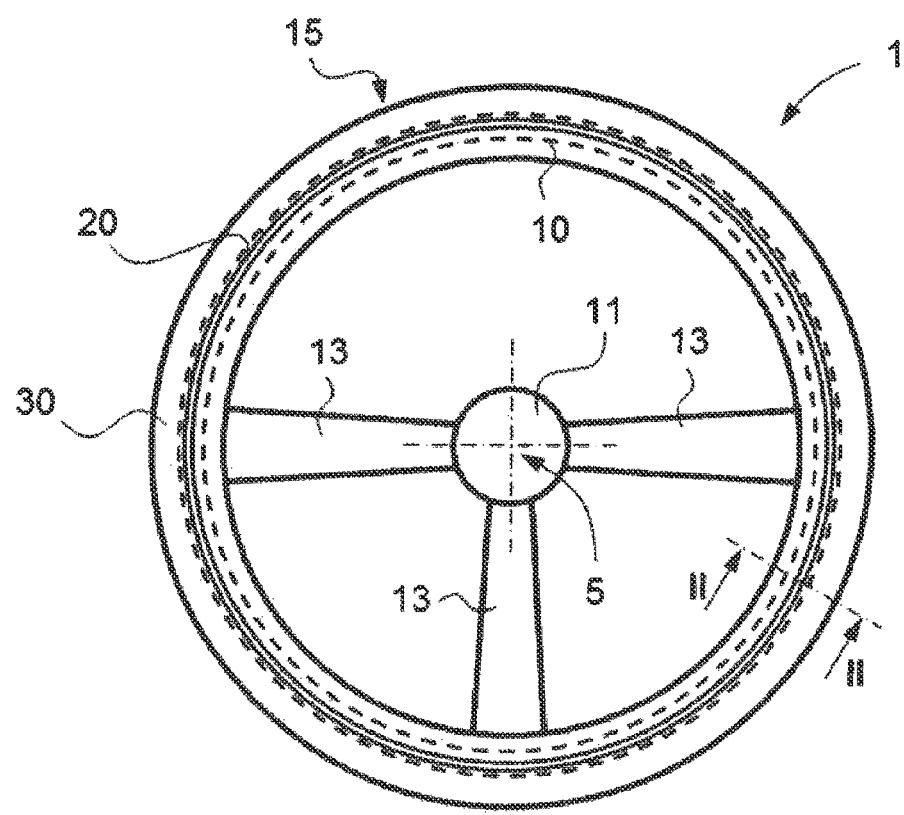

[Fig. 2]
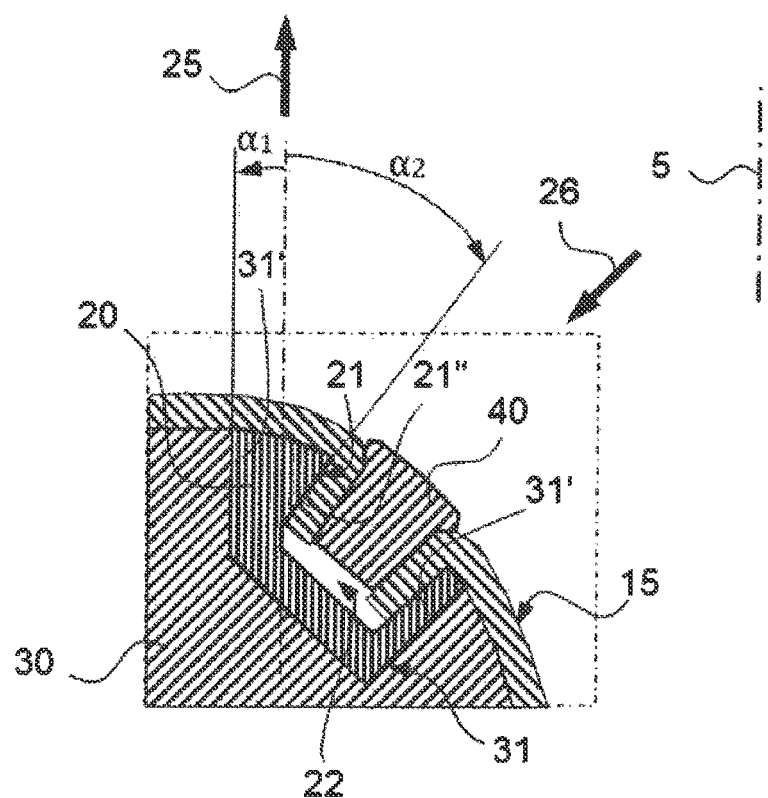

[Fig. 3]
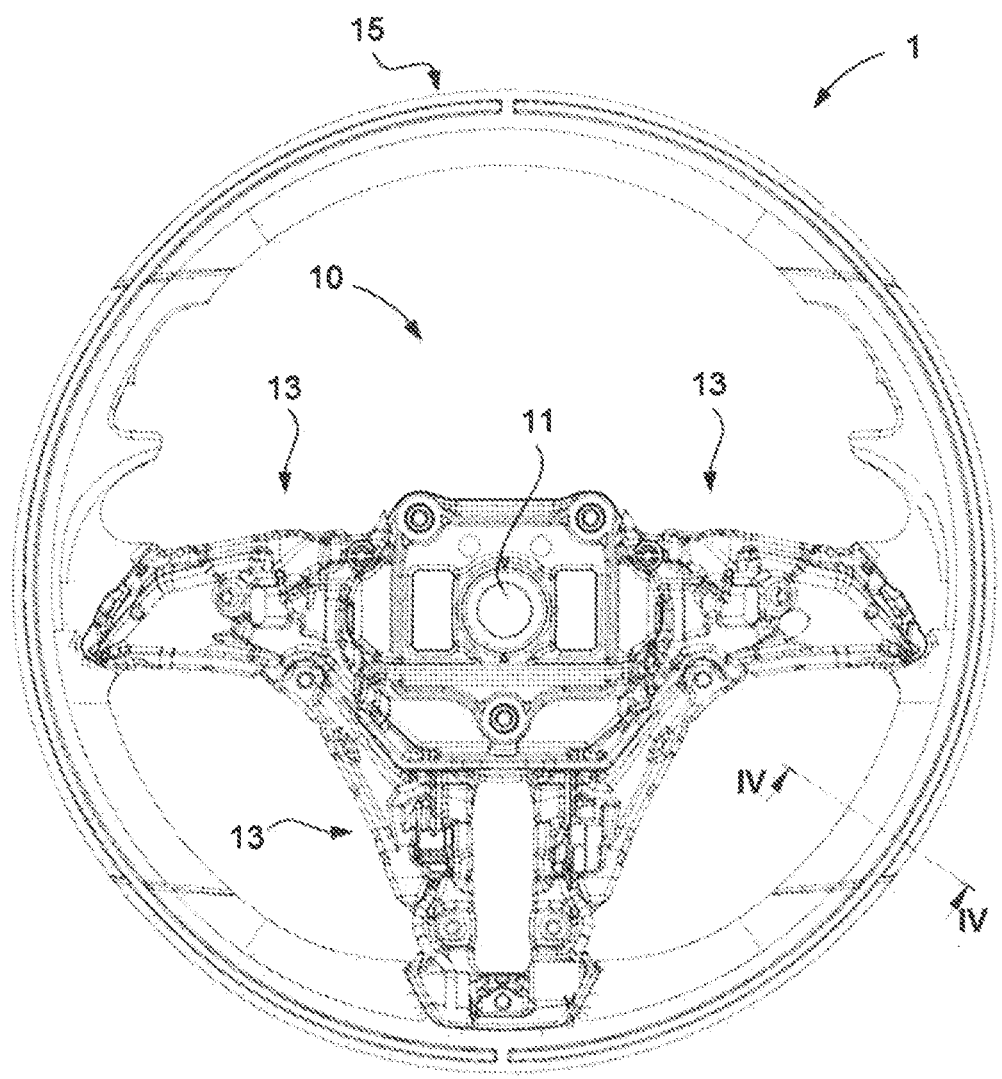

[Fig. 4]
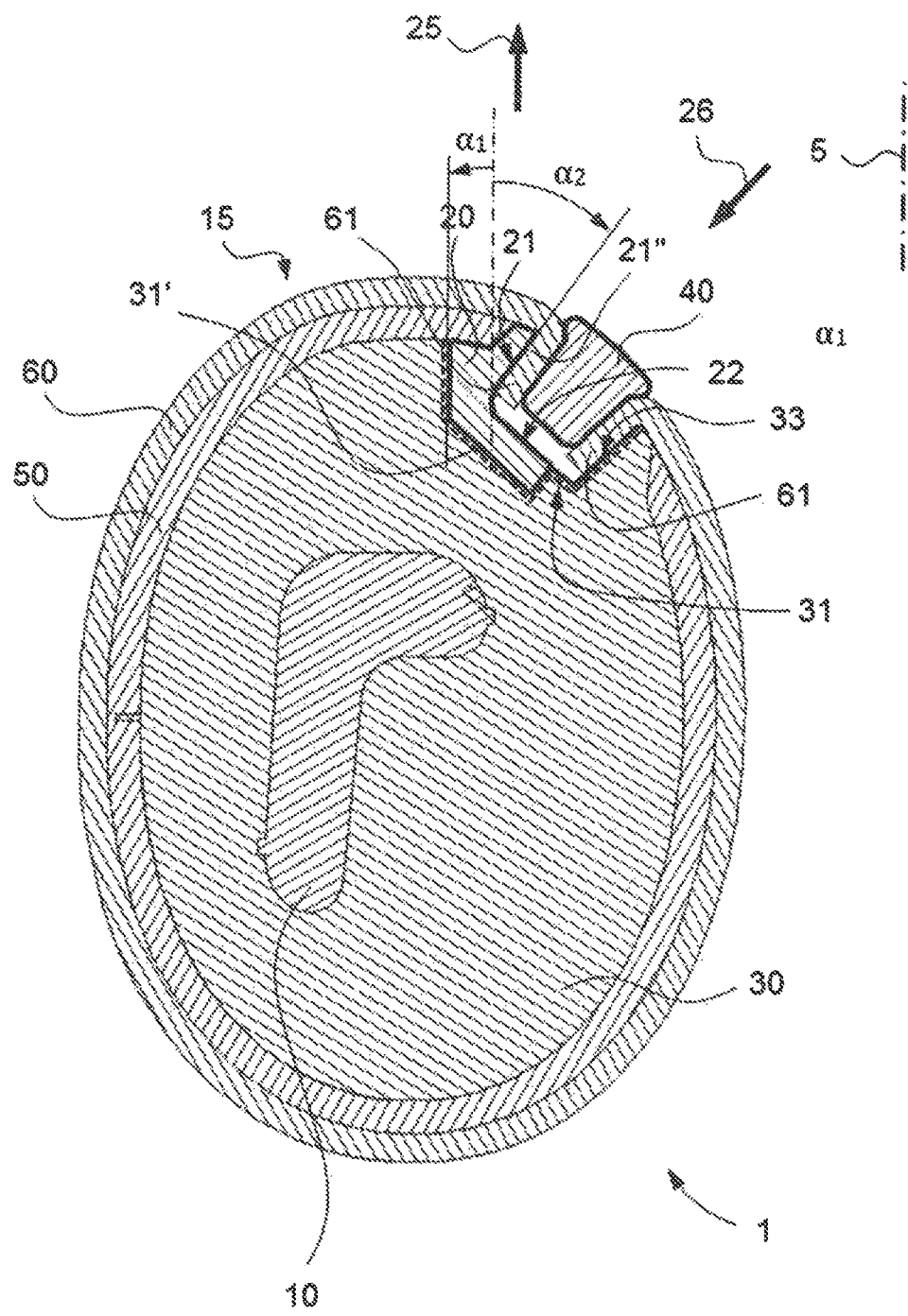

STEERING WHEEL

TECHNICAL FIELD

The present invention generally relates to the field of vehicles, particularly the field of steering wheels such as those for motor vehicles, for example.

A steering wheel is typically composed of a frame comprising a hub from which radii or spokes extend that connect the hub to the rim that may be gripped by a driver. Forming the backbone or skeleton of the steering wheel, the frame may be obtained by injection under pressure of a light metal, such as aluminum or magnesium. This frame may then be molded, in an operation called foaming of the steering wheel, by a body generally formed from a urethane type foam.

The steering wheel may then comprise a sheathing reinforcement for the body molded onto the rim. This sheathing reinforcement is configured to be inserted into a recess made in the foam body. The sheathing reinforcement constitutes a rigid support on which a sheath such as leather can be folded over without this fold deforming the foam body. The fold may be held by an insert visible by a driver.

PRIOR ART

Documents GB980673 and U.S. Pat. No. 6,443,030 disclose steering wheels comprising a groove made in the injected foam body and receiving flaps or folds of leather sheathing.

The foaming operation of the steering wheel is generally obtained from a two-part mold. For economic reasons, it is advantageous that the groove made in the body molded onto the rim be obtained directly by the foaming operation. However, depending on its profile or its radial position on a transverse section of the body of the rim, this groove may require a particular mold or method of implementation simply because it cannot be demolded from a standard two-part mold.

For example, when the groove has at least one inner undercut side, i.e., a negative relief angle, it may be impossible to demold such a groove without providing a more expensive mold, for example in three parts. Such a mold should then comprise an upper shell, a lower shell and a movable slide allowing the undercut side to be disengaged relative to the extraction direction of the molded part.

Documents US2014/0013898 and DE10328988 each describe a steering wheel wherein the body molded onto the rim is provided with a groove receiving a sheathing reinforcement. This sheathing reinforcement has a U-shaped profile in order to receive therein the ends of a trim sheath held by an insert or a ring inserted into the U-shaped profile of the sheathing reinforcement. However, either the groove made in this molded body cannot be obtained by molding without slider because it does not have a profile in relief, or the location of the insert is limited on the steering wheel because it must be received in the sheathing reinforcement only in the demolding direction of the groove.

However, the presence of an undercut groove for receiving an insert therein remains advantageous in order to offer greater freedom of positioning the insert on the rim.

As a result, the arrangement of an undercut groove in a body molded on a rim in order to receive therein a sheathing reinforcement proved to be complex, particularly when the sheathing reinforcement must be able to be at least partially embedded in the groove.

Consequently, there is a benefit in finding a more appropriate and efficient solution that makes it possible, at least in part, to resolve the aforementioned disadvantages.

DISCLOSURE OF THE INVENTION

To that end, in a first aspect the present invention relates to a steering wheel configured to rotate about a steering axis and comprising:
a rim formed of a body molded onto a frame, the body having a first mold release axis,
a first groove arranged in the body in a demoldable manner relative to the first mold release axis, and
a sheathing reinforcement arranged to be inserted into the first groove of the body and to at least partially form a second groove.

According to the invention, the second groove is arranged to receive an insert along an insertion direction separate from the first mold release axis, and the sheathing reinforcement comprises at least an undercut portion relative to a first mold release axis.

According to the following implementation, the first groove is obtained by a method of molding from a simple mold, typically having an upper mold and a lower mold that are movable relative to one another; the mold having no slider type device in order to form the first groove. In other words, the first groove is formed from the upper or lower mold. The first groove is thus obtained at less expense.

Advantageously, the object of the invention makes it possible to easily obtain a steering wheel provided with a sheathing reinforcement which:
has at least one undercut portion, offering great freedom in determining the location of an insert on the rim, and which
may be inserted into a groove that can be easily formed, for example from a standard two-part mold in the molded body.

Advantageously, the first mold release axis coincides with the steering axis.

In a preferred embodiment, the sheathing reinforcement may be configured to be embedded at least in part in said first groove.

Preferably, the first groove may comprise at least a first inner side that has a zero or positive relief angle relative to the first mold release axis.

In another embodiment, the first groove may have a positive or zero relief angle relative to the first mold release axis.

In another embodiment, the undercut portion may comprise at least a second inner side that has a negative relief angle relative to the first mold release axis.

Preferably, the second groove may be open on the exterior of the body of the rim.

Also preferably, the second groove may be formed partially from said undercut portion and partially from a portion in relief of the first groove.

In one embodiment, the insert may be a decorative part or an electrode. The insert is in direct contact with a part of the body of an occupant of the vehicle when the part of the occupant's body is in contact with the steering wheel in the area where the insert is located.

Also preferably, the steering wheel may further comprise a trim sheath of the body of the rim, said sheath being held in contact with the undercut portion between the sheathing reinforcement and the insert.

In a preferred embodiment, the sheathing reinforcement may be configured to be glued, welded and/or mechanically secured in said first groove.

In another embodiment, the first groove may be obtained by molding.

In one embodiment, the sheathing reinforcement may be arranged in a demoldable manner relative to a second mold release axis.

In another embodiment, the sheathing reinforcement may have a positive or zero relief angle relative to the second mold release axis. Thus, the sheathing reinforcement is obtained at low cost thanks to an injection mold with no slider.

Preferably, the body of the rim may be a urethane foam.

According to one embodiment, in a cutting plane comprising the first mold release axis, the first groove may comprise a wall parallel to the first mold release axis.

According to one embodiment, in a cutting plane comprising the first mold release axis, the first groove may be unsymmetrical.

According to one embodiment, the first mold release axis may be parallel to or coincide with a steering column axis.

According to one embodiment, the first groove may not have any undercut relative to the first mold release axis.

According to one embodiment, the first groove may extend along the rim, particularly over at least 120° of the rim, at least 180° of the rim, at least 225° of the rim, and preferentially 360°.

According to one embodiment, the first groove may be moldable or injectable with a one-piece mold insert. In particular, the first groove may be entirely moldable or injectable with a one-piece mold insert, for example over at least 120° of the rim, at least 180° of the rim, at least 225° of the rim, and preferentially 360° of the rim. The manufacturing mold remains simple, with no need for providing a slider insert or movable inserts. Basically, the first groove has no undercut relative to the steering column axis.

According to one embodiment, the sheathing reinforcement may form a second symmetrical groove, in a cutting plane perpendicular to the second groove. According to this embodiment, the undercut of the second groove relative to the first mold release axis is achieved by the symmetrical shape.

According to one embodiment, the sheathing reinforcement may have a coupling shape that mates or engages with the first groove.

According to one embodiment, the exterior coupling shape may be symmetrical in the cutting plane perpendicular to the second groove.

According to one embodiment, the exterior coupling shape may be asymmetrical in the cutting plane perpendicular to the second groove.

In a second aspect, the invention also relates to a motor vehicle comprising a steering wheel according to any one of the embodiments of this steering wheel or according to any possible combination of these embodiments.

BRIEF DESCRIPTION OF THE FIGURES

FIG. 1 is a schematic illustration of a steering wheel in a plan view;

FIG. 2 shows a partial cross-section of the steering wheel of FIG. 1 along the line II-II of said FIG. 1;

FIG. 3 is a more realistic illustration of a steering wheel in a view similar to that of FIG. 1;

FIG. 4 shows a cross-section of the steering wheel of FIG. 3 along the line IV-IV of said FIG. 3.

DETAILED DESCRIPTION

With reference to FIG. 1, it schematically shows a steering wheel 1 in a plan view that may be a view from the front or the back. The steering wheel 1 comprises a frame 10 typically produced from an alloy or a light metal, such as magnesium or aluminum. The frame 10 typically constitutes the skeleton or backbone of the steering wheel. It comprises a hub 11 from which radii or spokes 13 extend which connect the hub 11 to a core or rim 15. This rim constitutes the part that gives the circular or substantially circular shape to the steering wheel; this may be any other shape, open or closed.

The rim 15 is formed from a body 30 molded onto the frame 10. This body generally consists of a material injectable into a mold, typically a urethane foam obtained for example from a polyurethane elastomer (PU, PUR). Therefore, the body 30 has a first mold release axis 25 best visible in the cross-sections of FIGS. 2 and 4.

The steering wheel 1 is configured to turn around a steering axis 5, in particular an axis of a steering column of a vehicle equipped with such a steering wheel. This steering wheel 1 further comprises a reinforcement sheathing 20 typically circular or essentially circular in shape since it adopts the general shape of the steering wheel as seen in plan view. The reinforcement sheathing 20 may be formed in one piece or several arc of circle sections, for example. Although preferably occupying the full circumference of the steering wheel in plan view, the reinforcement sheathing may nevertheless occupy only a portion of said circumference.

As best shown in FIG. 2, illustrating a partial radial cross-section along line II-II of FIG. 1, the reinforcement sheathing 20 is configured to be inserted into a first groove 31 of the body 30 and to form at least partially a second groove 22. This groove 31 is arranged in the body 30 in a demoldable manner relative to the first mold release axis 25 and is formed to correspond with the reinforcement sheathing, over the entire circumference of the steering wheel in plan view or over a portion of said circumference. As shown in this figure, the first groove 31 is located on the outer part of the rim 15. The demoldable nature of the groove 31 means that the mold, which enables this groove 31 to be obtained, has no demolding slider device for producing the groove 31. It should be noted, however, that this groove 31 may have small undercuts that may be obtained from a mold with no slider.

As clearly shown in the schematic cross-section of FIG. 2, the second groove 22 is arranged to receive an insert 40 along an insertion direction 26 separate from the first mold release axis 25. The second groove 22, located like the first groove 31 on the exterior of the rim, could not be formed directly in body 30 with no slider in an injection mold oriented according to the first mold release axis 25. In addition, the reinforcement sheathing 20 comprises at least one undercut portion 21 relative to the first mold release axis 25. More precisely, this portion is undercut when the reinforcement sheathing 20 is positioned in the first groove 31. In the illustration of FIG. 2, this undercut portion 21 is characterized by a relief angle $\alpha_2$ that is negative relative to the first mold release axis 25.

The concepts of relief or positive relief angle, and undercut or negative relief angle, refer here to the field of rigid mold molding techniques. In this field, the relief represents the slope of the walls of the mold needed to enable the demolding of the parts. The concept of undercut or negative relief angle refers to when the shape of the part prevents direct demolding and therefore requires using a more complex mold comprising at least one slider to enable the release of the undercut portion. Thus, the relief angle is positive or zero if the shape of the part allows its direct demolding (with no slider), and otherwise is negative.

As a result of the object of the invention, it is possible to easily obtain a steering wheel provided with a sheathing reinforcement having at least one undercut portion, while still allowing this sheathing reinforcement to be able to be inserted into a groove that may easily be formed for example from a standard mold of two parts that are movable relative to one another. In other words, it becomes possible to position, in the first groove 31 and along the steering axis 5, a sheathing reinforcement 20 making it possible to define, by means of the undercut portion 21, at least one portion impossible to demold and which may be configured to receive an insert, for example.

Preferably, the absolute value of the relief angle $\alpha_2$ of the undercut portion 21 is more than 20 degrees, even greater than 30 degrees.

In a preferred embodiment, the sheathing reinforcement 20 is not only inserted into the first groove 31, but is also configured to be embedded, in other words fitted, at least in part into this first groove. This scenario is shown in particular in the schematic example provided in FIG. 2 wherein sheathing reinforcement 20 is configured to be completely embedded in the first groove 31 so that the sheathing reinforcement itself forms the second groove 22 in its entirety.

Preferably, and as shown in particular in this same FIG. 2, the first groove 31 is a groove in relief, that is, a groove that has a portion in relief relative to the first mold release axis 25. To that end, the first groove 31 may for example comprise at least a first inner side 31' that has a zero or positive relief angle $\alpha_1$ relative to the first mold release axis 25.

In a first preferred embodiment, the undercut portion 21 of the sheathing reinforcement 20 comprises at least a second inner side 21" that has a negative relief angle $\alpha_2$ relative to the first mold release axis 25. This embodiment is therefore distinguished from another embodiment wherein the relief angle could be zero.

Preferably, it may also be noted in FIG. 2 that the second groove 22 is open on the exterior of the body 30 of the rim 15. In other words, the second groove 22 is oriented so as to be open towards the exterior of the steering wheel 1.

FIGS. 3 and 4 are illustrations of a steering wheel model 1 viewed respectively from the top and in radial cross-section along line IV-IV of FIG. 3. In the cross-section of FIG. 4, it can be seen that the sheathing reinforcement 20 itself alone does not define a second groove 22 in its entirety, but it only defines a portion of said second groove. Indeed, in this figure the second groove 22 is formed at least in part from the undercut portion 21 of the sheathing reinforcement 20 and in part from a portion of the first groove 31.

Preferably, this portion of first groove is also a relief portion 33. In this FIG. 4, this first groove 31 is shown by a broken line and has a shape that may be demolded relative to the first mold release axis 25, which preferably is parallel to the steering axis 5.

In a preferred embodiment, the second groove 22 formed at least partially from the undercut portion 21, is configured to receive the insert 40.

This insert 40 could be a decorative part, particularly a trim part of the steering wheel 1 having the shape of all or part of a ring or crown produced from wood or any other material. Alternatively or in addition, the insert could consist of an electrode, for example an electrode to measure the driver's heart rate.

In one embodiment, the steering wheel 1 further comprises a trim sheath 60 of the body 30 of the rim. This sheath 60 may typically be a leather sheath or one made of another preferably supple material. As shown in FIG. 4, the sheath 60 could be held in contact with the undercut portion 21, between the sheathing reinforcement 20 and the insert 40, in particular by means of at least one of the ends 61 of this sheath.

The sheathing reinforcement 20 could be configured to be glued, welded and/or mechanically secured in the first groove 31. In a case where this sheathing reinforcement is welded, ultrasound or laser welding could be preferred.

Preferably, the first groove 31 is obtained by molding, in particular during the overmolding of the body 30 and even more specifically by a molding that allows a direct demolding of this first groove 31. Thus, the mold used to obtain the first groove 31 may advantageously be a mold with no slider, which simplifies the molding/demolding operations and contributes to reducing production costs of the steering wheel.

In one embodiment, the sheathing reinforcement 20 could be arranged in a demoldable manner relative to a second mold release axis, i.e., relative to a mold release axis independent of the first mold release axis 25 of the body 30. Furthermore, such a sheathing reinforcement could also have a positive or zero relief angle relative to this second mold release axis. Advantageously, it is therefore possible to obtain, on the steering wheel, a groove with undercut areas obtained from parts that were injected in a simple way or at less cost.

Also preferably, the body 30 of the rim 15 is a urethane foam (for example PU, PUR) or an injectable material produced from such a foam.

In a second aspect, the invention relates to a vehicle, in particular an automobile, comprising a steering wheel 1 according to any one of the embodiments described hitherto or according to any one of the possible combinations of these embodiments.

The invention claimed is:

1. A steering wheel configured to rotate about a steering axis and comprising:
   a rim formed of a body molded onto a frame, the body having a first mold release axis,
   a first groove arranged in the body in a demoldable manner relative to the first mold release axis,
   a sheathing reinforcement arranged to be inserted into the first groove of the body and at least partially form a second groove,
   wherein the second groove is arranged to receive an insert in an insertion direction separate from the first mold release axis,
   in that the sheathing reinforcement defines at least one portion which is undercut relative to the first mold release axis, wherein the at least one portion which is undercut relative to the first mold release axis defines at least a portion of an outer peripheral sidewall of the second groove, and
   a trim sheath, said trim sheath being held in contact with the undercut portion between the sheathing reinforcement and the insert, wherein the at least one portion which is undercut is configured to prevent direct demolding of an adjacent structure within the second groove along the first mold release axis, wherein the sheathing reinforcement comprises an inner side and an outer side, the outer side being at least substantially parallel with the first mold release axis, the inner side defining the undercut portion and a portion of the second groove, and wherein the inner side is angled relative to the outer side.

2. The steering wheel according to claim 1, wherein the sheathing reinforcement is configured to be at least partially embedded in said first groove.

3. The steering wheel according to claim 1, wherein the first groove has a positive or zero relief angle relative to the first mold release axis.

4. The steering wheel according to claim 3, wherein said first groove comprises at least a first inner side that has a positive relief angle relative to the first mold release axis.

5. The steering wheel according to claim 1, wherein said undercut portion comprises at least a second inner side that has a negative relief angle relative to the first mold release axis.

6. The steering wheel according to claim 1, wherein the second groove is open on the exterior of the body of the rim.

7. The steering wheel according to claim 1, wherein the second groove is formed in part from said undercut portion and in part from a relief portion of the first groove.

8. The steering wheel according to claim 1, wherein the insert is a decorative part or an electrode.

9. The steering wheel according to claim 1, wherein the sheathing reinforcement is configured to be glued, welded and/or mechanically secured in said first groove.

10. The steering wheel according to claim 1, wherein said first groove is obtained by molding.

11. The steering wheel according to claim 1, wherein the sheathing reinforcement is arranged in a demoldable manner relative to a second mold release axis.

12. The steering wheel according to claim 11, wherein the sheathing reinforcement has a positive or zero relief angle relative to the second mold release axis.

13. The steering wheel according to claim 1, wherein the body of the rim is a urethane foam.

14. The vehicle steering wheel according to claim 1 in combination with a motor vehicle.

15. The steering wheel according to claim 1, wherein the peripheral sidewall extends to an outermost surface of the sheathing reinforcement relative to the steering wheel.

16. The steering wheel according to claim 1, further comprising an overlying structure comprising a first end and a second end opposite the first end, wherein the first end of the overlying structure extends along the peripheral sidewall in between the insert and the sheathing reinforcement, wherein the overlying structure extends around the body, and wherein a second end of the overlying structure extends adjacent to the insert along an opposite side of the insert.

17. The steering wheel according to claim 16, wherein the overlying structure comprises a trim sheath.

* * * * *